United States Patent
Cajias et al.

(10) Patent No.: US 11,402,214 B2
(45) Date of Patent: Aug. 2, 2022

(54) METHOD AND APPARATUS FOR PROVIDING AERIAL ROUTE CALCULATION IN A THREE-DIMENSIONAL SPACE

(71) Applicant: HERE Global B.V., Eindhoven (NL)

(72) Inventors: Raul Cajias, Berlin (DE); Daniel Rolf, Berlin (DE)

(73) Assignee: HERE Global B.V., Eindhoven (NL)

( * ) Notice: Subject to any disclaimer, the term of this patent is extended or adjusted under 35 U.S.C. 154(b) by 226 days.

(21) Appl. No.: 16/709,556

(22) Filed: Dec. 10, 2019

(65) Prior Publication Data

US 2021/0172740 A1 Jun. 10, 2021

(51) Int. Cl.
*G01C 21/20* (2006.01)
*G08G 5/00* (2006.01)

(52) U.S. Cl.
CPC ........... *G01C 21/20* (2013.01); *G08G 5/0034* (2013.01); *G08G 5/0069* (2013.01)

(58) Field of Classification Search
CPC .... G01C 21/20; G08G 5/0069; G08G 5/0034; G08G 5/0026; G08G 5/045; G08G 5/0013; B64C 39/024; G05D 1/00
See application file for complete search history.

(56) References Cited

U.S. PATENT DOCUMENTS

| | | | |
|---|---|---|---|
| 9,818,304 B2 | 11/2017 | Modica et al. | |
| 10,082,803 B2 | 9/2018 | Ham et al. | |
| 11,062,396 B1 * | 7/2021 | Konrardy | G07C 5/08 |
| 2011/0160950 A1 | 6/2011 | Naderhirn et al. | |
| 2015/0120094 A1 | 4/2015 | Kimchi et al. | |
| 2017/0045894 A1 * | 2/2017 | Canoy | G08G 5/0013 |
| 2018/0246529 A1 | 8/2018 | Hu et al. | |
| 2019/0051198 A1 | 2/2019 | Nimmagadda et al. | |
| 2020/0380876 A1 * | 12/2020 | Sachdeva | G08G 5/0069 |

FOREIGN PATENT DOCUMENTS

WO 2018035578 A1 3/2018

OTHER PUBLICATIONS

Zompas, "Development of a Three Dimensional Path Planner for Aerial Robotic Workers", MSc Report, 2016, retrieved from https://pdfs.semanticscholar.org/900e/87b9c9228f755d8d37f9ee8f68532d0a0ffe.pdf, 39 pages.

Atte et al., "A Real-time 3D Path Planning Solution for Collision-free Navigation of Multirotor Aerial Robots in Dynamic Environments", Journal of Intelligent & Robotic Systems, Apr. 7, 2018, 21 pages.

* cited by examiner

*Primary Examiner* — Alan D Hutchinson
(74) *Attorney, Agent, or Firm* — Ditthavong, Steiner & Mlotkowski

(57) ABSTRACT

An approach is provided for aerial route calculation in a three-dimensional (3D) space. The approach, for example, involves receiving a request to route an aerial vehicle through the 3D space from a start location to a target location. The 3D is represented as 3D shapes (e.g., cubes). The approach also involves matching the start location and the target location respectively to a start shape and a target shape in the 3D space. The approach further involves computing a route through the 3D shapes from the start shape to the target shape based on a collision probability determined based on a first probability of survival due to volume-related factors, a second probability of survival due to aerial-vehicle-related factors, or a combination.

18 Claims, 16 Drawing Sheets

OUTPUT 601: <cube 1, collision probability 1>, <cube 2, collision probability 2>, ..., <cube n, collision probability n>

METHOD AND APPARATUS FOR PROVIDING AERIAL ROUTE CALCULATION IN A THREE-DIMENSIONAL SPACE

BACKGROUND

Routing an aerial vehicle or drone (e.g., unmanned aerial vehicle (UAV)) in a three-dimensional (3D) space or environment presents unique challenges due to the complex geometry of obstacles (trees, cables, lampposts) the aerial vehicle's flightpath or route. Because these challenges, service providers face significant technical issues with respect to providing mapping data (e.g., proper modeling of the three-dimensional word) to enable aerial vehicles to be routed more safely through 3D space, particularly when operating autonomously.

SOME EXAMPLE EMBODIMENTS

Therefore, there is a need for providing aerial route calculation in a 3D space based, for instance, on pre-computed collision probability data mapped to the 3D space.

According to one embodiment, a method comprises receiving a request to route the aerial vehicle through the 3D space from a start location to a target location. The 3D space, for instance, is represented as a plurality of three-dimensional shapes (e.g., cubes). The method also comprises matching the start location and the target location respectively to a start shape (e.g., start cube) and a target shape (e.g., target cube) of the plurality of three-dimensional shapes. The method further comprises computing a route through the plurality of three-dimensional shapes from the start shape to the target shape based on a collision probability determined based on a first probability of survival due to volume-related factors (e.g., volume-related factors such as obstacle density), a second probability of survival due to aerial-vehicle-related factors (e.g., vehicle reliability, range, remaining battery, etc.), or a combination thereof for the plurality of three-dimensional shapes from the start shape to the target shape. The route includes a set of three-dimensional shapes between the start shape and the target shape.

According to another embodiment, an apparatus comprises at least one processor, and at least one memory including computer program code for one or more computer programs, the at least one memory and the computer program code configured to, with the at least one processor, cause, at least in part, the apparatus to receive a request to route the aerial vehicle through the 3D space from a start location to a target location. The 3D space, for instance, is represented as a plurality of three-dimensional shapes (e.g., cubes). The apparatus is also caused to match the start location and the target location respectively to a start shape (e.g., start cube) and a target shape (e.g., target cube) of the plurality of three-dimensional shapes. The apparatus is further caused to compute a route through the plurality of three-dimensional shapes from the start shape to the target shape based on a collision probability determined based on a first probability of survival due to volume-related factors (e.g., volume-related factors such as obstacle density), a second probability of survival due to aerial-vehicle-related factors (e.g., vehicle reliability, range, remaining battery, etc.), or a combination thereof for the plurality of three-dimensional shapes from the start shape to the target shape. The route includes a set of three-dimensional shapes between the start shape and the target shape.

According to another embodiment, a computer-readable storage medium carries one or more sequences of one or more instructions which, when executed by one or more processors, cause, at least in part, an apparatus to receive a request to route the aerial vehicle through the 3D space from a start location to a target location. The 3D space, for instance, is represented as a plurality of three-dimensional shapes (e.g., cubes). The apparatus is also caused to match the start location and the target location respectively to a start shape (e.g., start cube) and a target shape (e.g., target cube) of the plurality of three-dimensional shapes. The apparatus is further caused to compute a route through the plurality of three-dimensional shapes from the start shape to the target shape based on a collision probability determined based on a first probability of survival due to volume-related factors (e.g., volume-related factors such as obstacle density), a second probability of survival due to aerial-vehicle-related factors (e.g., vehicle reliability, range, remaining battery, etc.), or a combination thereof for the plurality of three-dimensional shapes from the start shape to the target shape. The route includes a set of three-dimensional shapes between the start shape and the target shape.

According to another embodiment, an apparatus comprises means for receiving a request to route the aerial vehicle through the 3D space from a start location to a target location. The 3D space, for instance, is represented as a plurality of three-dimensional shapes (e.g., cubes). The apparatus also comprises means for matching the start location and the target location respectively to a start shape (e.g., start cube) and a target shape (e.g., target cube) of the plurality of three-dimensional shapes. The apparatus further comprises means for computing a route through the plurality of three-dimensional shapes from the start shape to the target shape based on a collision probability determined based on a first probability of survival due to volume-related factors (e.g., volume-related factors such as obstacle density), a second probability of survival due to aerial-vehicle-related factors (e.g., vehicle reliability, range, remaining battery, etc.), or a combination thereof for the plurality of three-dimensional shapes from the start shape to the target shape. The route includes a set of three-dimensional shapes between the start shape and the target shape.

According to one embodiment, a method comprises transmitting a request for a route through the three-dimensional space from a start location to a target location. The method also comprises receiving a route that is generated based on representing the three-dimensional space as a plurality of three-dimensional shapes in response to the request. The route matches the start location and the target location respectively to a start shape and a target shape of the plurality of three-dimensional shapes, and comprises the start shape, the target shape, and a set of the plurality of three-dimensional shapes traversing from the start shape to the target shape. The method further comprises receiving collision probability data for the plurality of three-dimensional shapes in the route. The method further comprises determining to reject or to accept the route based on the collision probability.

According to another embodiment, an apparatus comprises at least one processor, and at least one memory including computer program code for one or more computer programs, the at least one memory and the computer program code configured to, with the at least one processor, cause, at least in part, the apparatus to transmit a request for a route through the three-dimensional space from a start location to a target location. The apparatus is also caused to receive a route that is generated based on representing the three-dimensional space as a plurality of three-dimensional shapes in response to the request. The route matches the start location and the target location respectively to a start shape and a target shape of the plurality of three-dimensional shapes, and comprises the start shape, the target shape, and a set of the plurality of three-dimensional shapes traversing from the start shape to the target shape. The apparatus is further caused to receive collision probability data for the plurality of three-dimensional shapes in the route. The apparatus is further caused to reject or to accept the route based on the collision probability.

According to another embodiment, a computer-readable storage medium carries one or more sequences of one or more instructions which, when executed by one or more processors, cause, at least in part, an apparatus to transmit a request for a route through the three-dimensional space from a start location to a target location. The apparatus is also caused to receive a route that is generated based on representing the three-dimensional space as a plurality of three-dimensional shapes in response to the request. The route matches the start location and the target location respectively to a start shape and a target shape of the plurality of three-dimensional shapes, and comprises the start shape, the target shape, and a set of the plurality of three-dimensional shapes traversing from the start shape to the target shape. The apparatus is further caused to receive collision probability data for the plurality of three-dimensional shapes in the route. The apparatus is further caused to reject or to accept the route based on the collision probability.

According to another embodiment, an apparatus comprises means for transmitting a request for a route through the three-dimensional space from a start location to a target location. The apparatus also comprises means for receiving a route that is generated based on representing the three-dimensional space as a plurality of three-dimensional shapes in response to the request. The route matches the start location and the target location respectively to a start shape and a target shape of the plurality of three-dimensional shapes, and comprises the start shape, the target shape, and a set of the plurality of three-dimensional shapes traversing from the start shape to the target shape. The apparatus further comprises means for receiving collision probability data for the plurality of three-dimensional shapes in the route. The method further comprises determining to reject or to accept the route based on the collision probability.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing an aerial route through a three-dimensional (3D) space using collision probability data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
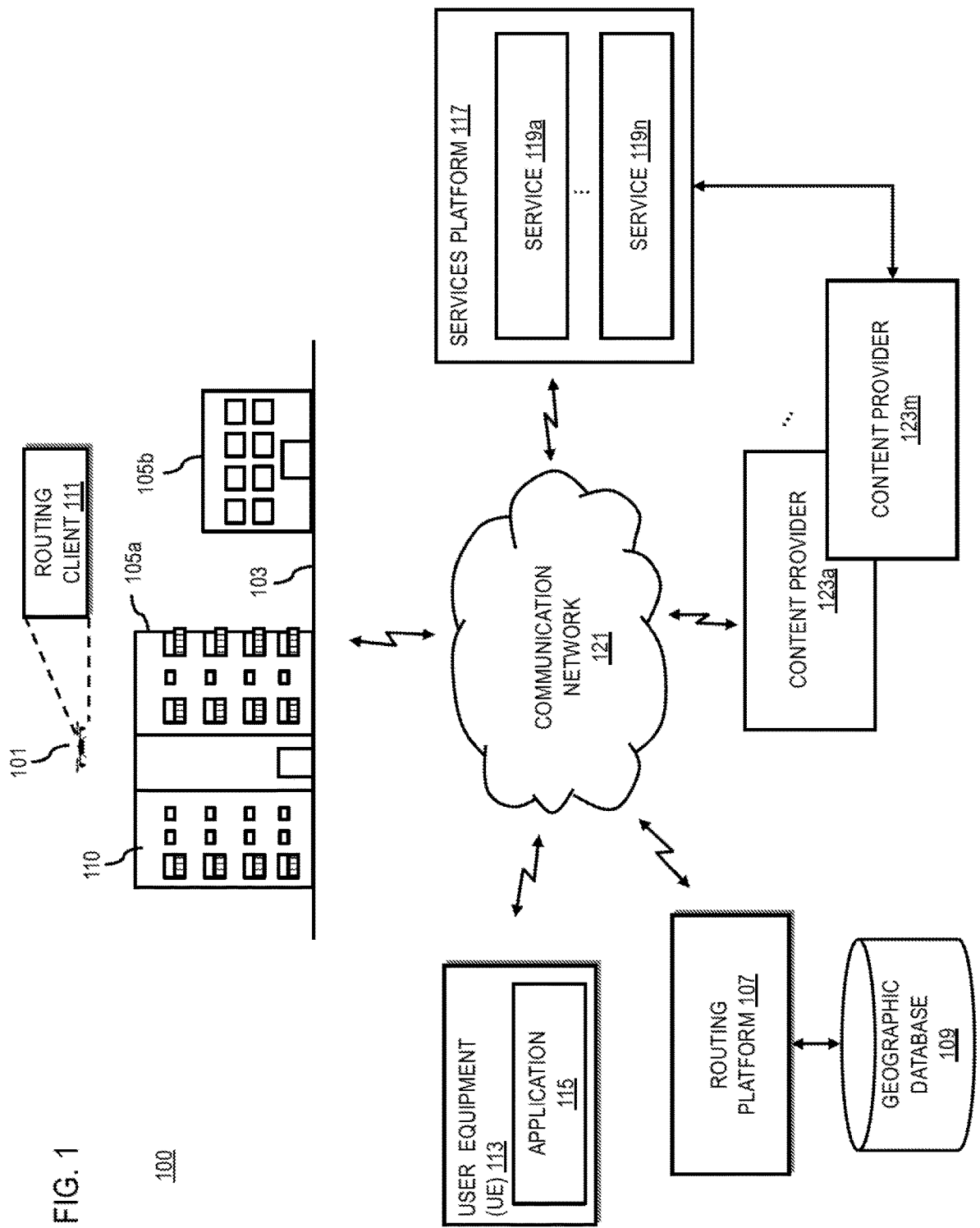
FIG. 1 is a diagram of a system capable of calculating an aerial route using a collision probability space, according to one embodiment.

FIG. 1 is a diagram of a system capable of calculating an aerial route using a collision probability space, according to one embodiment. The use of manned or unmanned aerial vehicles is becoming more widespread, leading to greater concern about flight safety with respect to aerial vehicle itself as well as the environment or 3D space in which it is operating. Generally, an aerial vehicle 101 operates by flying above streets 103, buildings 105*a* and 105*b* (also collectively referred to as buildings 105), and/or other complex 3D spaces where safety risks to the public and/or the aerial vehicle 101 are often present. Aerial routing in such a 3D environment presents unique challenges due, for instance, to the complex geometry of obstacles (e.g., buildings 105, trees, cables, lamp posts, etc.) present within the environment. For example, the absence of proper modeling of the 3D world results in the aerial vehicle 101's having to rely solely on onboard sensors for obstacle detection, or on human operators, to navigate around obstacles or other collision risks in the environment.

In other words, aerial vehicles 10 historically rely on onboard sensors and/or human operators to navigate complex 3D environments. Moreover, common obstacles are often avoided by routing the aerial vehicle 101 to fly over known road networks and/or at a higher altitude to minimize risks. These traditional heuristics for aerial routing may not be applicable in all cases, thereby potentially preventing autonomous aerial vehicles 101 from gaining wider adoption.

Further, by relying on simple heuristics or solely on onboard sensors, no estimate or only a less specific estimate can be made of the risk of the planned path or route of the aerial vehicle 101. This lack of visibility on potential loss or risks can prevent reliable usage of aerial vehicles 101. Therefore, service providers face significant technical challenges when assessing and then presenting the risks associated with a calculated aerial route (e.g., a collision probability of the aerial vehicle 101).

To address these technical challenges, the system 100 of FIG. 1 introduces a capability to provide route calculation in a 3D environment using a pre-computed collision-probability route network. In one embodiment, the system 100 of FIG. 1 includes a routing platform 107) to compute an aerial or 3D route from point A to point B for an aerial vehicle 101 (e.g., a drone) using a collision-probability 3D map (e.g., as stored in a geographic database 109). In another embodiment, the system 100 of FIG. 1 includes a routing client 111 (e.g., in the aerial vehicle 101) that interacts with the routing platform 107 for the computation and receiving of an aerial route from point A to point B for the aerial vehicle 101 using a collision-probability 3D map. By way of example, the various embodiments described enable aerial or 3D routes to be computed for aerial vehicles 101 using a collision-probability graph. This has the advantage of providing important survival probabilities to the aerial vehicle 101 that can be used to preempt client-side maneuvers, as well as valuable information for operators, dispatch systems, etc. of the aerial vehicles 101 (e.g., for risk planning, loss prevention, dispatching an appropriate aerial vehicle 101, etc.).

Figure 2:
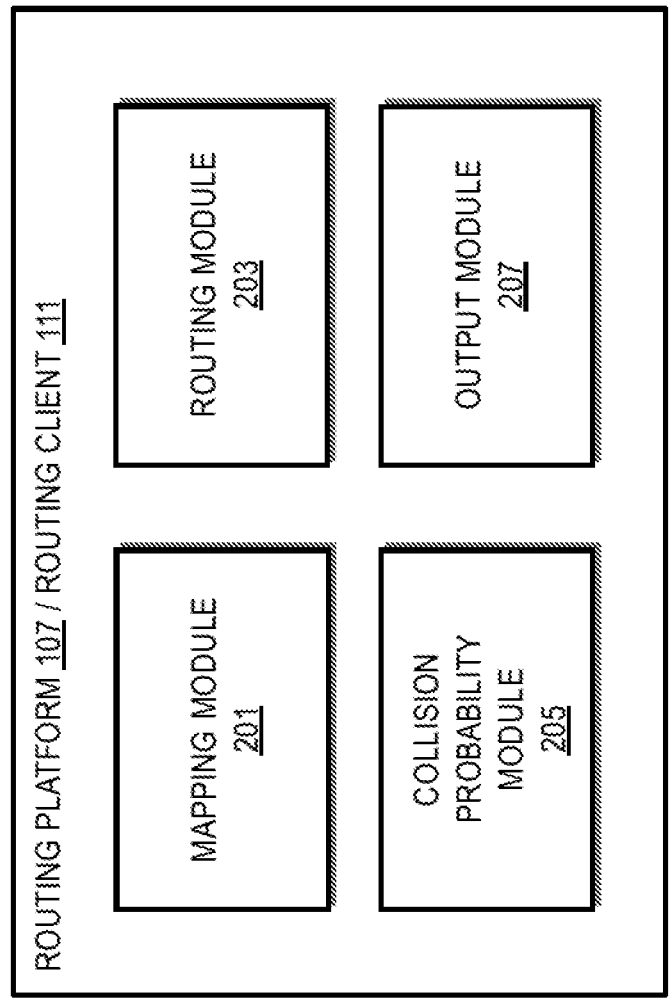
FIG. 2 is a diagram of the components of an aerial routing platform and/or routing client, according to one embodiment.

FIG. 2 is a diagram of the components of the aerial routing platform 107 and/or routing client 111, according to one embodiment. In one embodiment, the routing platform 107 and/or routing client 111 include one or more components for providing and using an aerial or 3D route based on a collision-probability map, according to the various embodiments described herein. As shown in FIG. 2, the routing platform 107 and/or routing client include a mapping module 201, a routing module 203, a collision probability module 205, and an output module 207. The above presented modules and components of the routing platform 107 and/or routing client 111 can be implemented in hardware, firmware, software, or a combination thereof. It is contemplated that the functions of these components may be combined or performed by other components of equivalent functionality. Though depicted as separate entities in FIG. 1, it is contemplated that the routing platform 107 and/or routing client 111 may be implemented as a module of any of the components of the system 100 (e.g., a component of the aerial vehicle 101, a client device such as a user equipment (UE) device 113 executing the routing client 111 as an application 115, a services platform 117, one or more services 119*a*-119*n* of the services platform 117, etc.). In another embodiment, the routing platform 107, routing client 111, and/or one or more of the modules 201-207 may be implemented as a cloud-based service, local service, native application, or combination thereof. The functions of these modules are discussed with respect to FIGS. 3-10 below.

Figure 3:
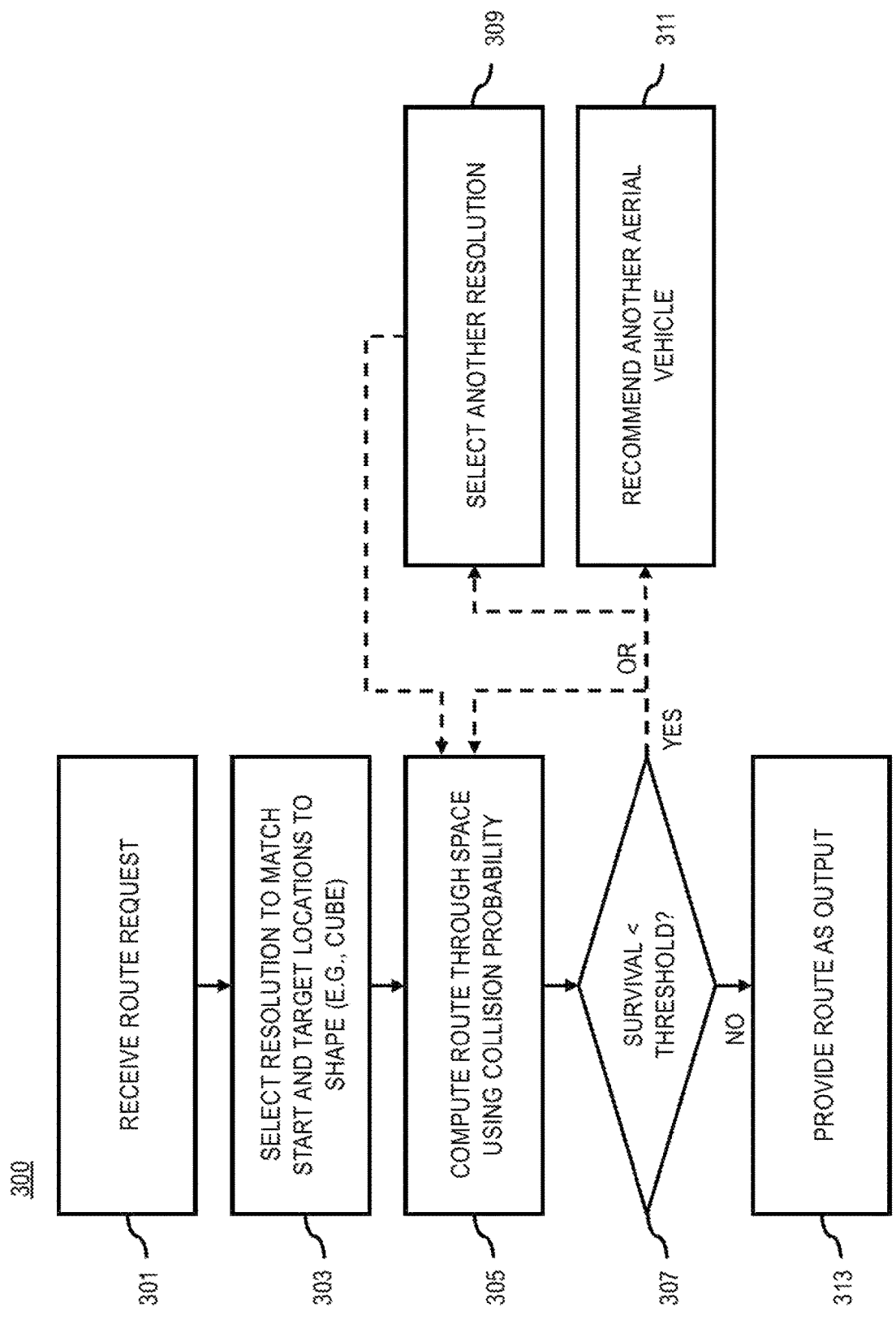
FIG. 3 is a flowchart of a process for calculating an aerial route using a collision probability space, according to one embodiment.
Figure 13:
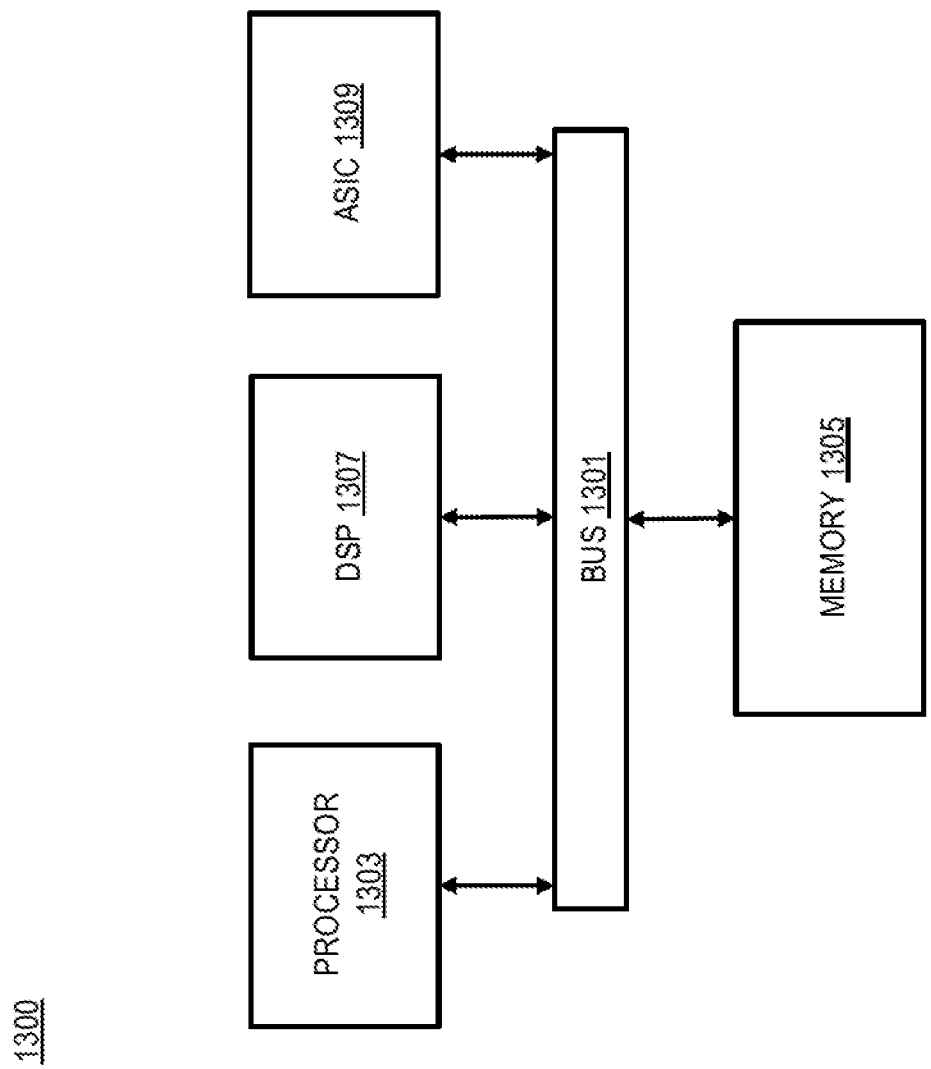
FIG. 13 is a diagram of a chip set that can be used to implement an embodiment.

FIG. 3 is a flowchart of a process for calculating an aerial route using a collision probability space, according to one embodiment. In various embodiments, the routing platform 107 and/or any of the modules 201-207 of the routing platform 107 may perform one or more portions of the process 300 and may be implemented in, for instance, a chip set including a processor and a memory as shown in FIG. 13. As such, the routing platform 107 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, to perform the process 300, the mapping module 201 of the routing platform 107 has access to a 3D collision-probability map that can be used to calculate an aerial route. The 3D collision-probability map can be queried from a geographic database 109 that stores the collision-probability data at variable resolution. The geographic database 109 can be a cloud-based database that includes the latest or most up-to-date version of the collision-probability as well as the underlying map data. In one embodiment, the variable resolution can be defined with respect a common 3D coordinate system (e.g., X, Y, Z coordinate system) shared by both the routing platform 107 and the routing client 111.

Figure 4A:
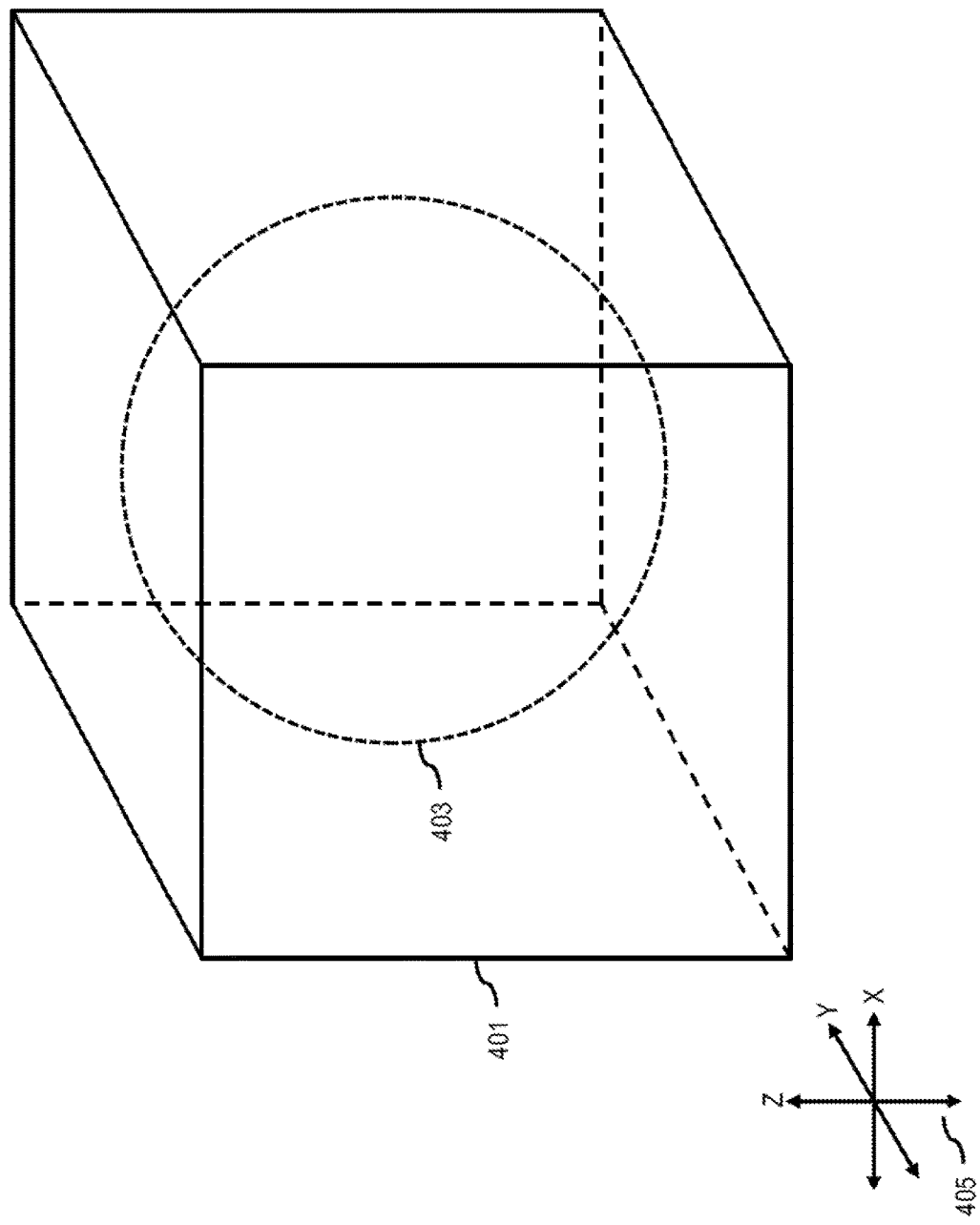
FIGS. 4A-4C are diagrams illustrating an example representation of a 3D space as discrete 3D volumes (e.g., cubes or other equivalent 3D shapes) for calculating an aerial route, according to one embodiment.
Figure 4B:
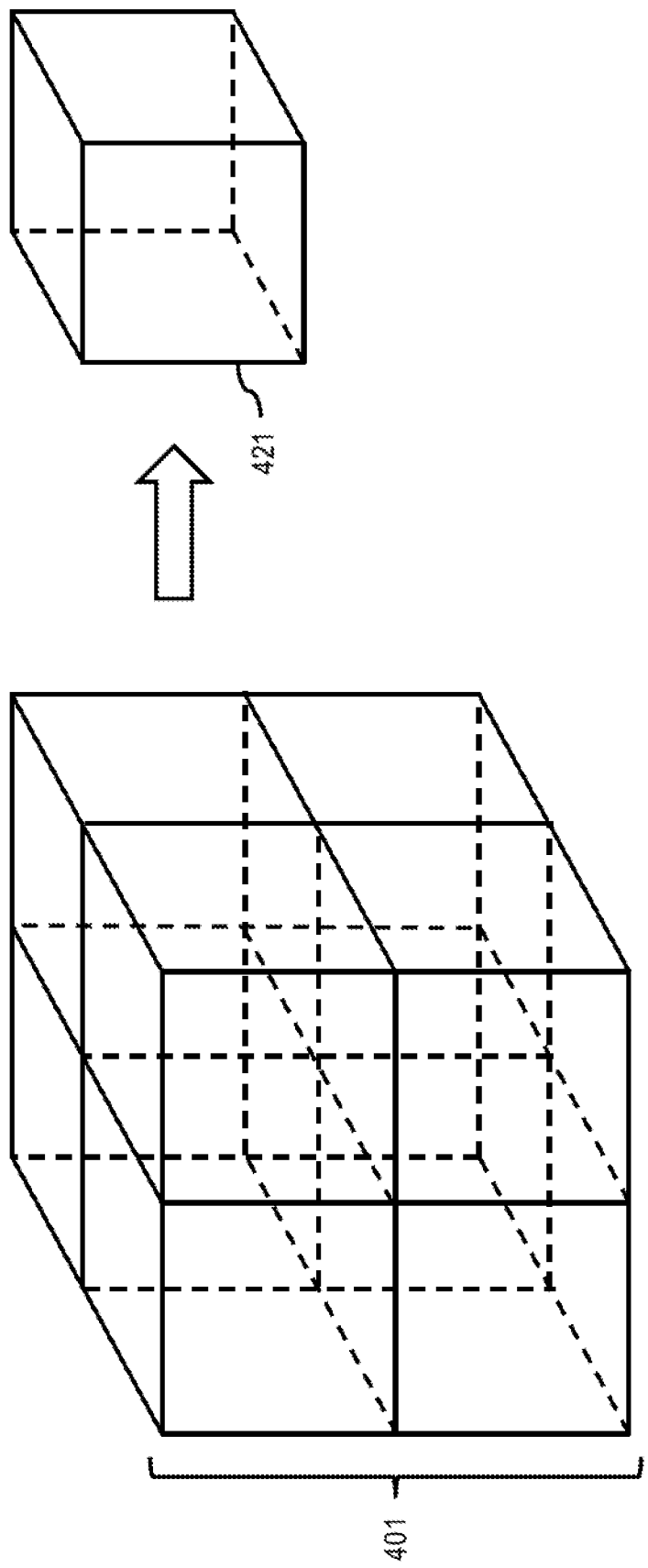

In one embodiment, the 3D coordinate system can be a global coordinate system that defines a 3D location on or above the Earth using X, Y, Z coordinates. The 3D space on or surrounding the Earth can also be represented using 3D shapes defined at a variable resolution. FIGS. 4A and 4B are diagrams illustrating an example representation of a 3D space as discrete volumes/partitions (e.g., cubes or other equivalent 3D shapes) for calculating an aerial route, according to one embodiment. Under this representation, a maximum or largest 3D volume is defined to enclose the space of interest. In this example, the 3D volume selected is a cube 401 and the space of interest is the entire Earth 403.

It is noted however, that the space of interest can be a space of any size that covers Earth 403 only partially or that covers any other heavenly body (e.g., moon) or other space (e.g., including extraterrestrial space). Locations in the cube 401 are given in a 3D X, Y, Z coordinate system. As shown, the Earth cube 401 is cube of length 16,000 km. At the center of this Earth cube 401 is the Earth 403 (e.g., radius equal to 6371 km), centered at coordinates (8,000 km, 8,000 km, 8,000 km). Hence, the Earth cube 401 fully covers the earth plus approximately 1,500 km of atmosphere. Any point within the Earth cube 401 can be easily converted from and to a latitude, longitude, and altitude coordinate system. However, in this example, an X, Y, Z coordinate system is more suitable for 3D maps.

As shown in FIG. 4B, for a given partitioning level or resolution of the initial Earth cube 401, the Earth cube can be partitioned into level^3 equal-sized cubes. In the example shown, at a partitioning or resolution level of 2, the Earth cube 401 is partitioned into 2^3 or 8 equal-sized cubes. At a partitioning level of 3, the Earth cube 401 is partitioned into 3^3 or 27 equal-sized cubes; at a partitioning level of 4, the Earth cube 401 is partitioned into 4^3 or 64 equal-sized cubes; and so on. A single partition or 3D volume 421 can be addressed by its center in 3D X, Y, Z coordinates, as well as the partitioning level from which its volume (e.g., the amount of 3D space the cube represents) can be derived. In one embodiment, each partition or 3D volume 421 is called a CUBE with its CUBE-ID defined at its center X, Y, Z coordinates and the corresponding partitioning or resolution level. Furthermore, each face of the cube 421 is assigned a unique identifier (ID) (e.g., CUBE-ID-0, . . . , CUBE-ID-5, where the numeral after CUBE-ID corresponds to a respective face of the cube or other 3D shape).

Figure 4C:
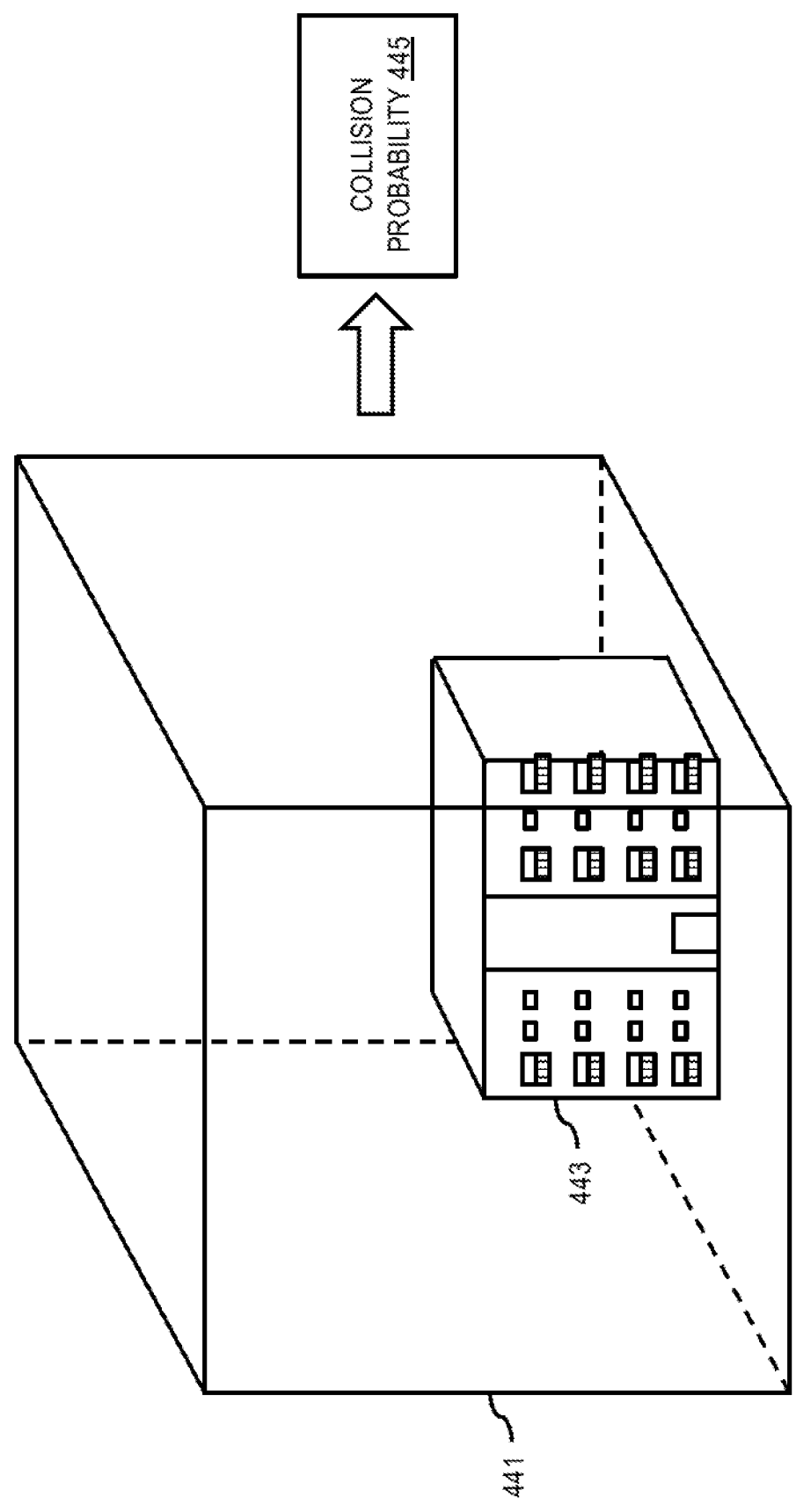

In one embodiment, to create the collision probability map, each cube or 3D volume is assigned a collision probability. By way of example, the collision probability can be determined by intersecting the space corresponding to the cube or other 3D shape with the 3D map of the geographic database 109. The 3D map, for instance, can include 3D models of structures (e.g., buildings), obstacles (e.g., wires, lamp posts, trees, etc.), and/or another map feature or element that can potentially pose a survival risk to aerial vehicles 101. In one embodiment, the collision probability is calculated as the ratio of the cube or 3D volume space that does not contain or is not contained in an element of the 3D map to the total volume of the cube or other 3D shape. For example, as shown in FIG. 4C the space corresponding to a cube 441 is used to query the geographic database 109 for 3D map data of the space. In this example, the query returns a 3D model 443 of a building that represents the dimensions of the building in space. The collision probability 445 can then be calculated based on the ratio of the space of the cube 441 that is not occupied by the 3D model 443 to the total volume of the cube 441. In other words, if the map data indicates that a greater proportion of the cube 441 is occupied by map elements, then the probability that an aerial vehicle 101 (e.g., drone) will collide with one of the elements is greater. In one embodiment, other external variables applicable to the space of the corresponding cube (e.g., wind patterns, historical collision data, etc.) may also be used as a parameter in determining the collision probability of the cube or other 3D shape. Other examples of external factors include but are not limited to: (1) population or people density under a route; (2) presence of electromagnetic fields; (3) absence of GPS or other location signals; (4) other weather conditions; (5) network (e.g., cellular network) coverage; and (6) aviation-related data (e.g., air traffic, etc.).

In one embodiment, the collision probability may be calculated for any partition level of resolution of the 3D map to create a collision-probability map. The collision probability map can be pre-computed and/or generated in real-time. In some embodiments, the collision probability can be computed separately for each partitioning level. In other embodiments, the collision probability for a cube at a partitioning level i is given by the cubes at partitioning level i+1 contained in it. For example, a cube at level i will have eight cubes contained within it that are at level i+1 each with respective collision probabilities (e.g., $p\_1$-$p\_8$). Then the collision probability for the cube at level i can be computed as $1-(1-p\_1)*(1-p\_2)* \ldots *(1-p\_8)$. In one embodiment, this property enables some optimizations to be made when probing for routes in a high-resolution map, as larger areas of the map may be explored at once.

Based on the representation above, the routing module 203 can generate a collision-probability routing graph as a weighted graph $G=(V,E)$, where V is the set of faces of all cubes in the map partition covering the route, and E is the set of cubes (if more than one cube), weighted by the probability of successful navigating (e.g., navigating without failure or collision) inside each cube or 3D volume as described in further detail below.

For example, in step 301 of the process 300, the routing module 203 of the routing platform 107 receives a request to route the aerial vehicle through a 3D space from a start location to a target location. The start and end locations (e.g., START/TARGET) are identified in the X, Y, Z coordinate system described in the embodiments above. In step 303, the routing module 203 picks or selects an arbitrary resolution R size for the map partition and matches the START and TARGET coordinates to the closest respective face of the cubes or other 3D shapes in that resolution. For example, the faces of the cube corresponding to the START or TARGET can be labeled as CUBE_ID_START and CUBE_ID_END.

Figure 5:
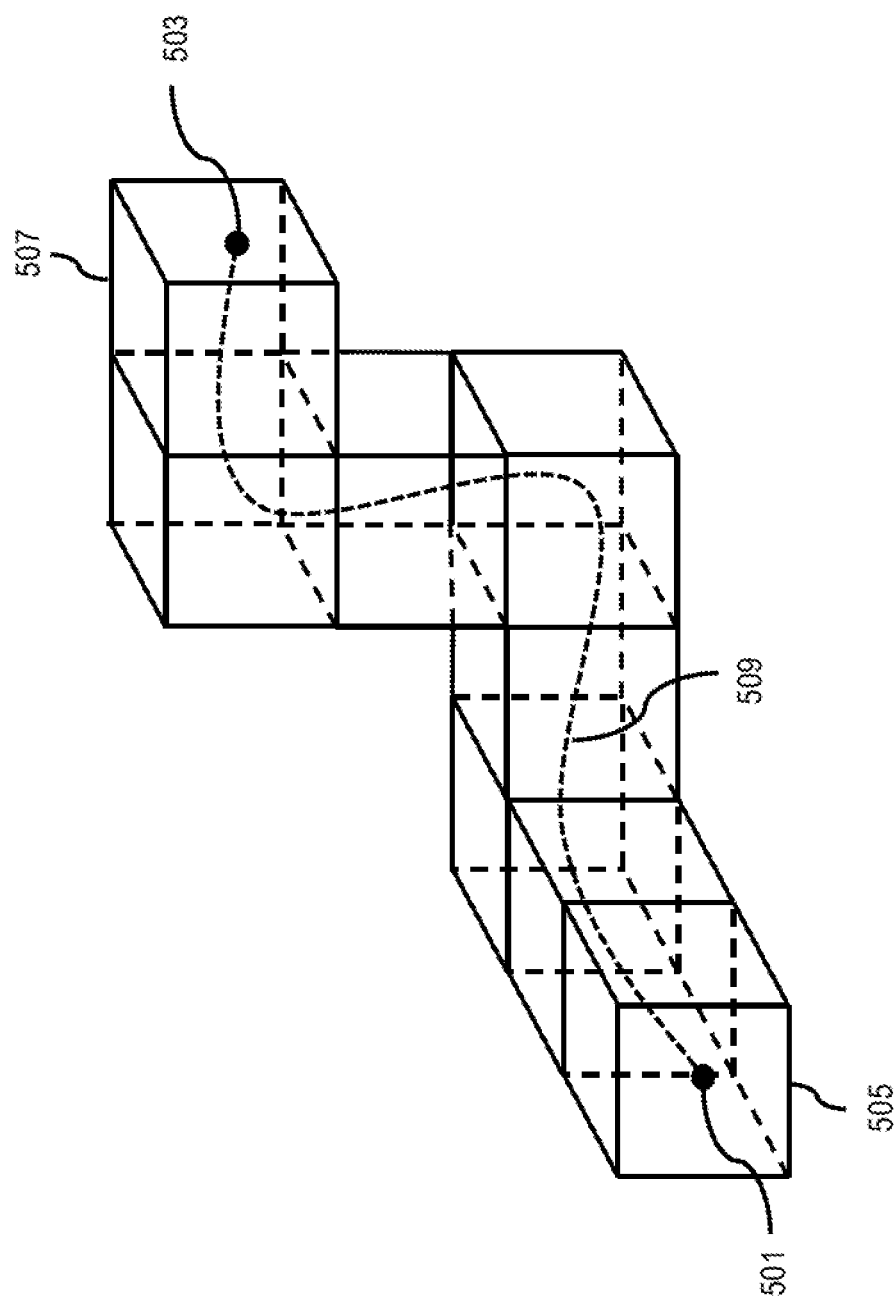
FIG. 5 is a diagram illustrating an example of representing a 3D route as a set of three-dimensional shapes (e.g., cubes or other equivalent 3D shapes), according to one embodiment.

In other words, the routing module 203 matches the start location and the target location specified in the routing request to a corresponding start shape and a target shape representing the 3D space. An example of this matching is illustrated in FIG. 5. As shown, a routing request is received specifying a start location 501 and a target location 503 using an X, Y, X coordinate system common to the requesting device (e.g., the aerial vehicle 101 or the routing client 111) and the routing platform 107. The routing module 203 matches the start location 501 to a corresponding start cube 505 at a selected resolution and matches the target location to a corresponding target cube 507 at the same resolution. It is contemplated that the routing module 203 can the resolution using any process or mechanism such as but not limited to a length of the route, map region, available map data, and/or the like.

In step 305, the routing module 203 then computes a route on the partition network using a modified Dijkstra algorithm or equivalent routing algorithm. The partition network, for instance, refers to the cubes or 3D shapes representing the 3D space in which the route is being computed. The faces of the cubes (or more generally the surfaces of the 3D shapes) of the partition network adjoin to enable the computation of a path the through the network. The routing module 203 uses the modified Dijkstra algorithm or any other equivalent routing algorithm to determine the path or route.

In one embodiment, the routing module 203 computes the route through the plurality of three-dimensional shapes from the start shape to the target shape based on a collision probability determined based on a first probability of survival due to volume-related factors, a second probability of survival due to aerial-vehicle-related factors, or a combination thereof for the plurality of three-dimensional shapes from the start shape to the target shape. For example, the routing module 203 interacts with the collision probability module 205 to determine factors for input into the routing algorithm (e.g., as cost factors). For example, a probability of survival due to cube-related (or shape-related) factors on a given cube i is given by $P\_survival = 1 - P\_i$. In one embodiment, the collision probability module 205 can compute the probability of survival due to shape-related factors ($P\_survival$) from collision probability for the cube or 3D shape from the 3D map of the geographic database 109 (e.g., as described in the embodiments above). In addition, the collision probability module 205 can consider external factors (e.g., real-time contextual factors) associated with the cube or shape including but not limited to wind, historical collision data, weather, visibility, etc.

In addition or alternatively, the collision probability module 205 can compute a second or alternate probability of survival due to intrinsic errors or factors of the aerial vehicle 101 (e.g., battery, wear and tear, etc.). In one embodiment, the probability of survival due to aerial-vehicle-related factors can be given or computed as a function of the number N of cubes or 3D shapes at the current resolution that the aerial vehicle 101 is predicted to traverse before the aerial vehicle 101 is predicted to fail or die because of internal problems due to the one or more intrinsic factors. For a resolution R, the probability of survival due to aerial-vehicle-related factors, for instance, can be denoted as $P\_traversal$ and can be calculated as: $P\_failure = 1/N$ and then $P\_traversal = 1 - P\_failure$.

In one embodiment, the probability of survival after traversing cube i given both factors (e.g., probability of survival due to shape-related factors and probability of survival due to aerial-vehicle-related actors) is $P = P\_survival * P\_traversal$. The collision probability module 205 can then compute the cost of expanding a node i in the partition network to include traversal of cube i in a route as $-\log(P)$. The routing module 203 hence uses the Dijkstra or equivalent routing algorithm to compute the path or route that minimizes the sum of $-\log(P)$ for all cubes or shapes along the path which is equivalent to the path or route that maximizes the product of all P along the route. Thus, this adjustment to the cost computation allows the routing algorithm to maximize the product of survival probability at each cube or shape traversal. This path or route therefore has the highest probability of reaching its destination at the given resolution R. Returning the example of FIG. 5, the route 509 traversing the cubes in between the start cube 505 and target cube 507 has the highest probability of survivability or conversely the lowest probability of collision based on the individual survival probabilities of each of the cubes or shapes traversed by the route 509.

In step 307, if the route computed has a probability of survival that is below a threshold value (e.g., 80%), the routing module 203 can select a different resolution for the map partition or shape representation of the 3D space (step 309). The process 300 then returns to step 305 to compute a route a the newly selected resolution. The threshold probability of survival value can be a system parameter or can be provided in the routing request by the routing client 111. In one embodiment, a lower resolution (e.g., a cube representing a greater volume of the 3D space) or a higher resolution (e.g., a cube representing lesser volume of the 3D space) can be used in an attempt to find a path that meets the target probability of survival threshold value. For example, a lower resolution cube or 3D shape encompassing a larger total volume of space may result in an increase the ratio of unoccupied space to total space, making the collision probability lower. On the other a higher resolution cube or 3D shape may in some cases enable the routing module 203 to find at smaller cube or 3D shape in clear space around an otherwise obstacle dense 3D space.

In one embodiment, the resolution can be selected individually for each different leg of the route. For example, if a traversal through a first cube in the route meets the probability threshold, but the second cube does not, the routing module 203 can select a new resolution for traversing the space corresponding to the second cube while maintaining the original resolution of the first cube.

In step 307, if no route exists with an acceptable survival probability, the routing module 203 can use this expected failure to select another aerial vehicle 101 with higher probability of traversal per cube than the aerial vehicle 101 for which the route was originally computed (step 311). As described above the probability of traversal is a function of both the probability of survival due to cube- or shape-related factors and probability of survival due to aerial-vehicle-related factors. Accordingly, the routing module 203 can recommend or determine another aerial vehicle 101 with a sufficiently high probability of survival due to aerial-vehicle-related factors to increase the overall probability of survival for the cube or shape to meet the threshold survival probability. For example, a heavier duty aerial vehicle 101 or drone with greater range or greater mean time between failure can be selected to complete a route that would otherwise not have an acceptable survival probability.

In another embodiment, the routing module 203 can use the computed survival or collision probability for a given route for other applications including but not limited to selecting an insurance or delivery cost for the aerial vehicle 101 and/or its payload. In this way, the routing module 203 can determine the insurance cost, the delivery cost, and/or the like for the aerial vehicle 101 to fly the route based on the computed collision probability for the route.

Figure 6:
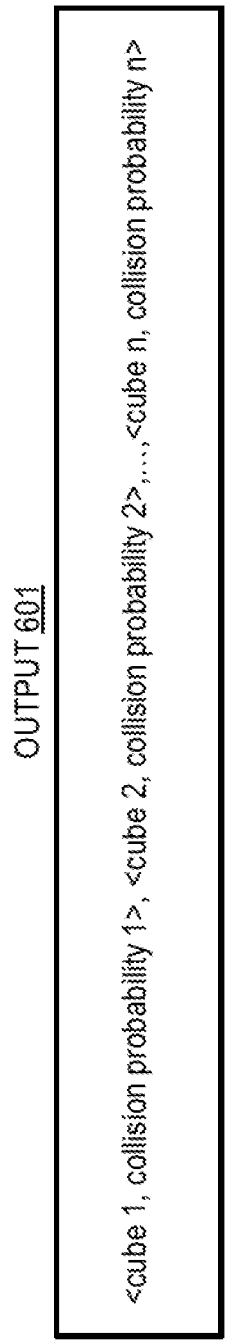
FIG. 6 is a diagram illustrating an example output encoding a route as a set of 3D volumes, according to one embodiment.

In step 313, the output module 207 can encode the computed route, along with the collision probabilities for each cube traversal to send to the aerial vehicle 101, an operator of the vehicle 101, an aerial vehicle service provider, and/or any other designated device or entity. As shown in FIG. 6, encoding the route comprises, for instance, generating an output 601 that includes a ordered list of the cubes or 3D shapes in the route (e.g., labeled according to the embodiments described above by cube and/or face ID) along with the corresponding collision or survival probability. In the example of FIG. 6, the output 601 includes a data structure listing the cube by ID and collision probability as data tuples for cubes 1-*n* of the compute route.

Figure 7:
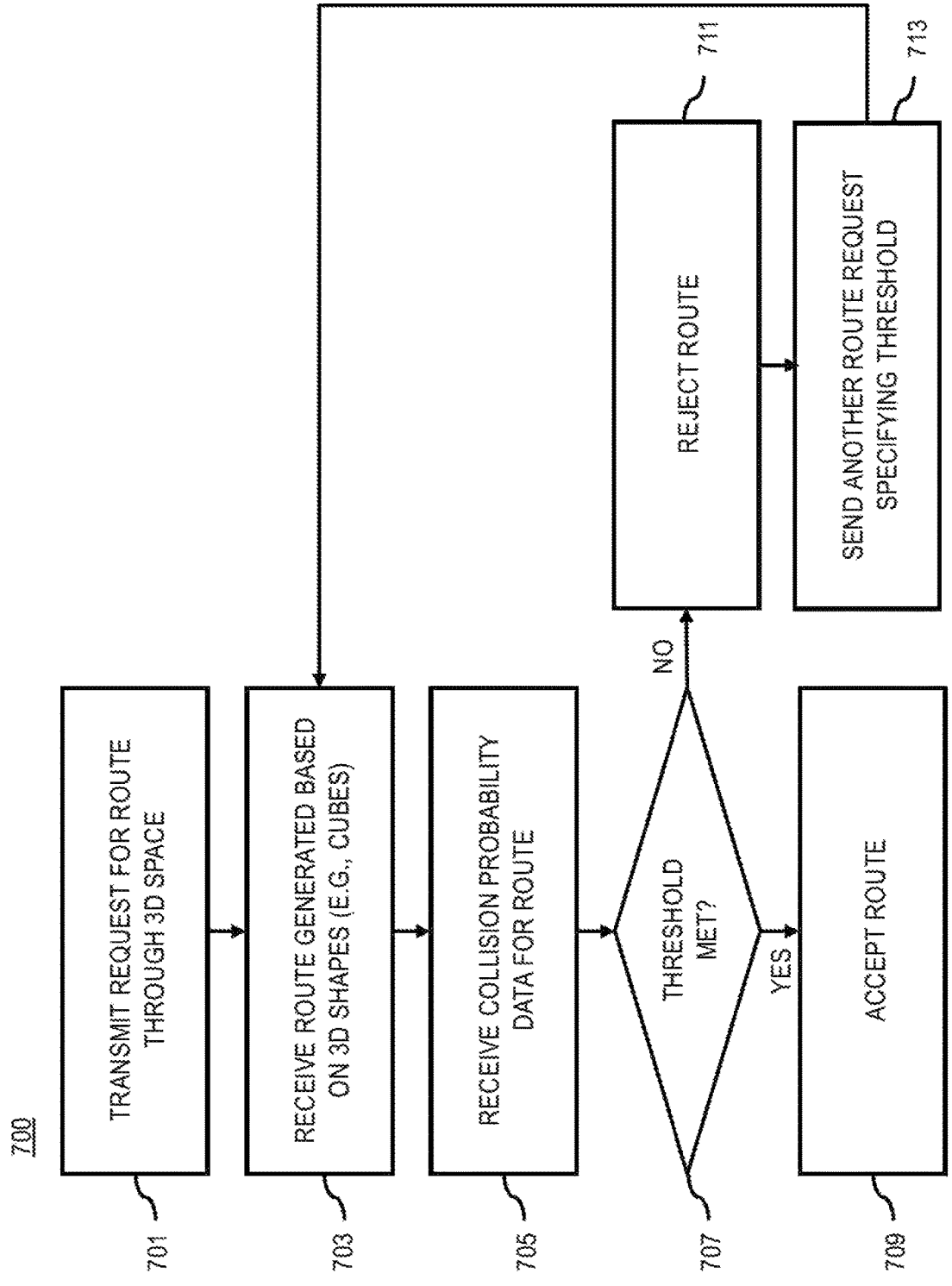
FIG. 7 is a flowchart of a process for receiving an aerial route calculated based on a collision probability space, according to one embodiment.

FIG. 7 is a flowchart of a process for receiving an aerial route calculated based on a collision probability space, according to one embodiment. In various embodiments, the routing client 111 and/or any of the modules 201-207 of the routing client 111 may perform one or more portions of the process 700 and may be implemented in, for instance, a chip set including a processor and a memory as shown in FIG. 13. As such, the routing client 111 and/or the modules 201-207 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps.

In step 701, the routing module 203 of the routing client 111 transmits a request to the routing platform 107 by encoding a start location and a target location in the X, Y, Z coordinate system common to both the routing client 111 and routing platform 107 as described in the embodiments above.

In response to the routing request, the routing module 203 receives an aerial route generated based on collision probability/probability of survival according to embodiments of the process 300 of FIG. 3 (step 703). For example, the route matches the start location and the target location specified in the request respectively to a start shape (e.g., start cube) and target shape (e.g., target cube) of the 3D shapes representing the 3D space. The route would then comprise the start shape, the target shape, and a set of the plurality of three-dimensional shapes traversing from the start shape to the target shape. The routing module 203 also receives collision probability data for cubes or 3D shapes in the route (step 705). The route, for instance, is an encoded ordered list of cube ids (or other 3D shape IDs) and their collision probability as illustrated in FIG. 6. In one embodiment, the collision probability is computed as a probability of survival based on both cube-related and aerial-vehicle related factors that represents the likelihood of a successful traversal of the corresponding cube or 3D shape.

In step 707, the routing module 203 of the routing client 111 checks the expected probability of survival for the route and may choose to reject or to accept the route by comparing the probability of survival to a threshold value. In step 709, based on determining that the probability of survival of the route meets or exceeds the threshold value, the routing module 203 can accept the route. In one embodiment, on acceptance of the route, the routing module 203 can configure the aerial vehicle 101 to operate or follow the route as described with respect to the process 800 of FIG. 8 below.

In step 711, based on determining that the probability of survival of the received route is not acceptable (e.g., is below the designated survival probability threshold), the routing module 203 can reject the received route. Then, in step 713, the routing module 203 can transmit a request for another route with a probability threshold hint. In other words, the routing module 203 can specify the desired or acceptable probability threshold for the routing platform 107 to use when computing the route. Alternatively, the routing client 203 can include the probability threshold hint in the initial routing request. After returning to step 703 and receiving the new route, the routing module 203 can reevaluate the probability of survival of the new route for acceptability and repeat the process until and acceptable route is received or no further routes are available from the routing platform 107 that meet the probability threshold.

In one embodiment, after accepting the route generated by the routing platform 107, the routing client 111 can configure an aerial vehicle 101 to perform the route according to FIG. 8 below.

Figure 8:
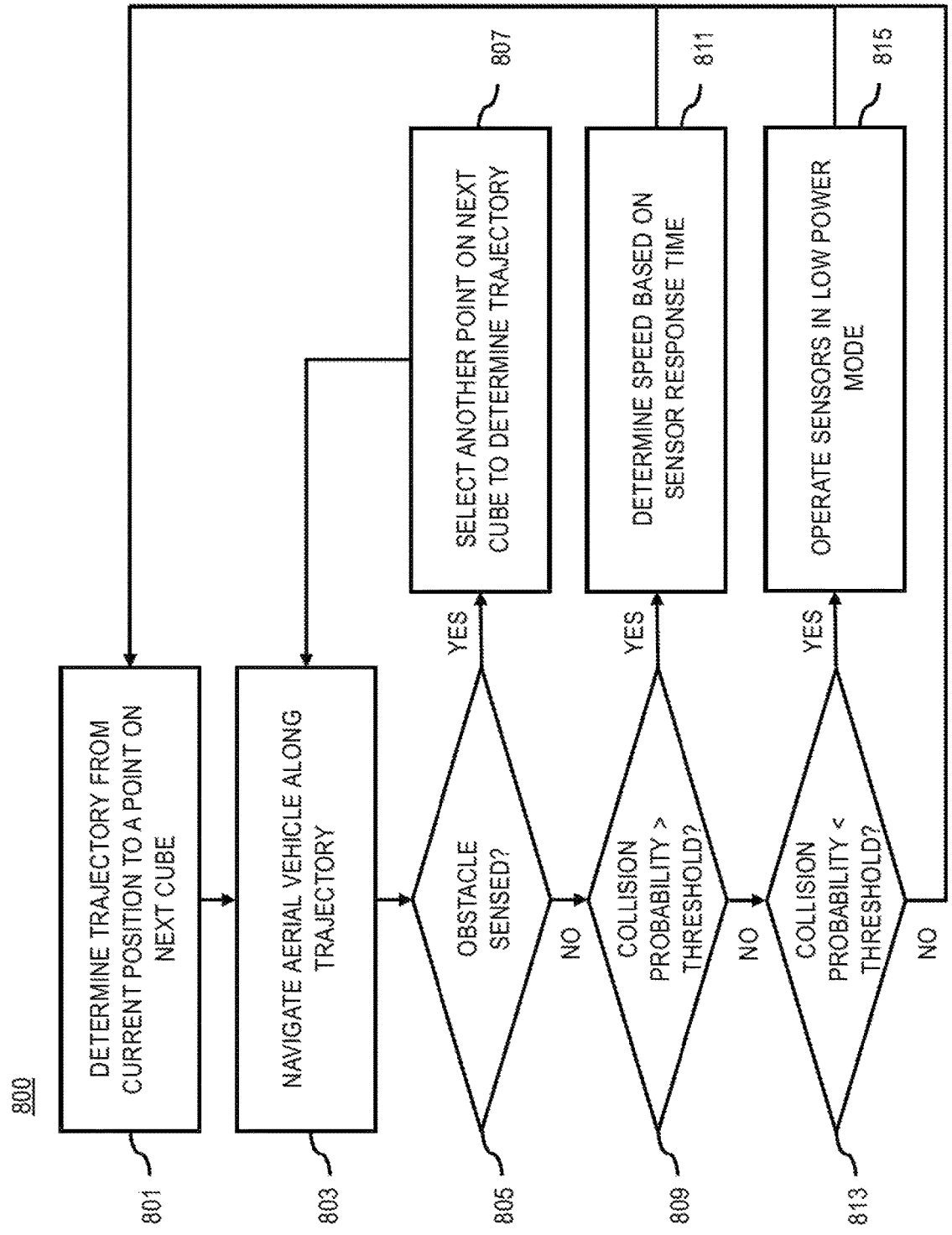
FIG. 8 is a flowchart of a process for using an aerial route calculated based on a collision probability space, according to one embodiment.

FIG. 8 is a flowchart of a process for using an aerial route calculated based on a collision probability space, according to one embodiment. In various embodiments, the routing client 111 and/or any of the modules 201-207 of the routing client 111 may perform one or more portions of the process 800 and may be implemented in, for instance, a chip set including a processor and a memory as shown in FIG. 13. As such, the routing client 111 and/or the modules 201-207 can provide means for accomplishing various parts of the process 800, as well as means for accomplishing embodiments of other processes described herein in conjunction with other components of the system 100. Although the process 800 is illustrated and described as a sequence of steps, its contemplated that various embodiments of the process 800 may be performed in any order or combination and need not include all of the illustrated steps.

The process 800 can be performed after the routing client 111 of an aerial vehicle 101 has received an aerial route according to the embodiments described herein (e.g., according to embodiments of the process 700 of FIG. 7). In one embodiment, to follow the cube path (e.g., the ordered list of 3D shapes representing the route) defined by the routing platform 107, the routing client 111 decode a series of trajectories from received route to navigate the aerial vehicle 101. For example, the routing module 203 of the routing client 111 can navigate or initiate a movement of the aerial vehicle 101 from its current position using a cube-by-cube or shape-by-shape approach.

Accordingly, in step 801, the routing module 203 determines or computes a trajectory from the current position of the aerial vehicle 101 to a point on the next cube or 3D shape in the route. In one embodiment, the point on the face of the next cube or 3D shape can be the closest point on the face of the next cube. However, it is contemplated that routing module 203 can use any process or mechanism (e.g., point in the center of the adjoining face of the next cube) for selecting the point on the next cube or 3D shape, and the point need not be the closest point. In one embodiment, the trajectory is a straight line between the current point and the point on the next cube or 3D shape.

Figure 9:
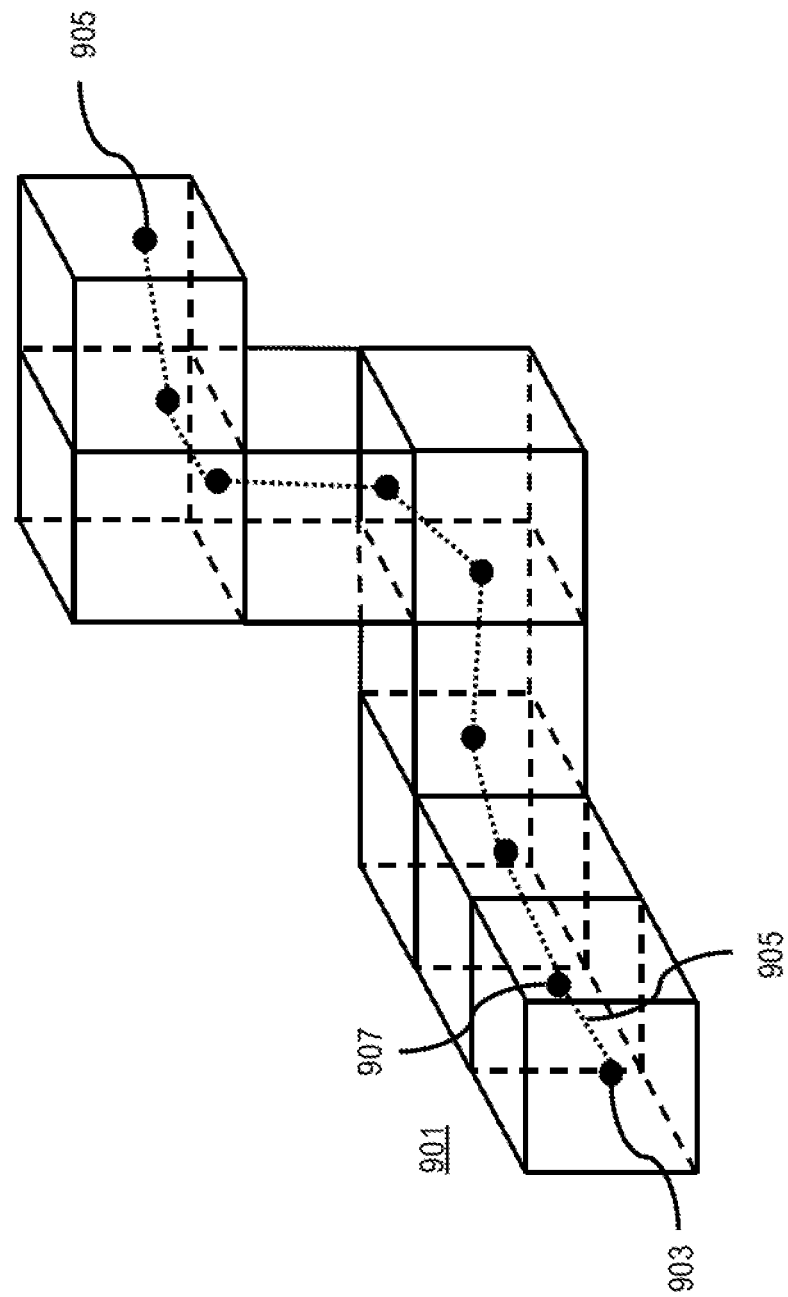
FIG. 9 is a diagram illustrating an example of constructing trajectories of an aerial route, according to one embodiment.

FIG. 9 is a diagram illustrating an example of constructing trajectories of an aerial route, according to one embodiment. In this example, a route 901 from a start location 903 to a target location 905 is received by the routing client 111 from the routing platform 107 as a sequence of cubes. The current position of the aerial vehicle 101 is at the start location 903, and the routing module 203 computes a trajectory 905 from the start location 903 to a point 907 on the face of the next cube in the route 901. Respective trajectories traversing each subsequent cube until the target location 905 is reached can then be calculated.

Figure 10:
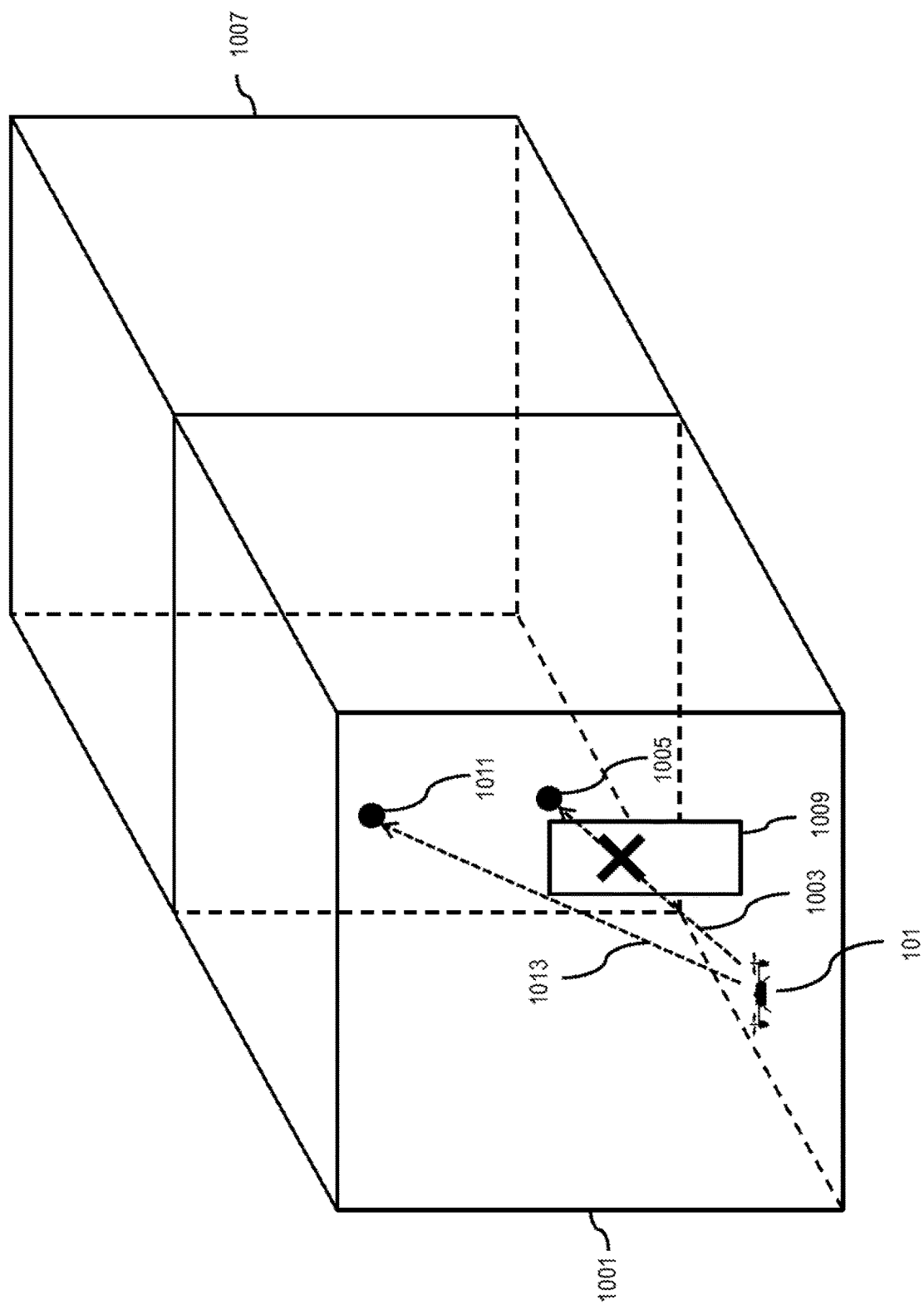
FIG. 10 is a diagram illustrating an example of re-calculating a trajectory in a 3D volume based on a sensed obstacle, according to one embodiment.

In step 803, the routing module 203 initiates a movement of the aerial vehicle 101 along the computed trajectory. As the aerial vehicle 101 moves along the trajectory, one or more onboard sensors of the aerial vehicle 101 can be activated to detect any potential obstacles blocking the path along the trajectory. In step 805, the routing module 203 determines whether any obstacles are sensed. In step 807, if obstacles in the trajectory are detected by onboard sensors, the path is adjusted by moving around the obstacle and selecting a new destination on the next cube face. FIG. 10 illustrates an example of an aerial vehicle 101 that is traversing cube 1001 by flowing an initial trajectory 1003 computed from the aerial vehicle 101's current location to a closest point 1005 on the face of the next cube 1007. However, onboard sensors of the aerial vehicle 101 detect the presence of an obstacle 1009 in way of the initial trajectory 1003. In response, the routing client 111 of the aerial vehicle 101 selects another point 1011 on face of the next cube 1007 to determine another trajectory 1013 to navigate around the obstacle 1009.

In one embodiment, the routing client 111 can use the probability of survival given for each leg or cube of its route by modulating its speed. For example, in step 809, the routing module determines whether the collision probability is greater than a threshold (or with the probability of survival is less than a threshold) for a given cube or leg of the route. In step 811, based on determining that the collision probability is greater than the threshold, the routing module 203 can navigate along the higher risk leg by lowering the speed of the aerial vehicle 101 to allow for a higher response time from onboard sensors of the aerial vehicle 101. In other words, the routing module 203 can navigate the aerial vehicle 101 along the trajectory through the higher risk area at a speed determined based on a response time of an onboard sensor of the aerial vehicle 101 that is used for obstacle detection.

In one embodiment, the routing module 203 can also determine whether the collision probability of a cube or 3D shape is below a threshold value (e.g., indicating that there is relatively low risk in traversing the cube) (step 813). For example, the threshold can be set so that probabilities below the threshold indicate that the cube is risk-free (e.g., open-air spaces). In step 815, based on determining that the collision probability is below the threshold, the routing module 203 can operate one or more onboard sensors of the aerial vehicle 101 in a low-power mode to save on battery life. In addition or alternatively, the routing module 203 can increase the navigation speed of the aerial vehicle 101 through the cube.

In one embodiment, once the aerial vehicle 101 reaches the target cube or 3D shape in which the target location is located, the routing module 203 can configure the aerial vehicle 101 to onboard sensors while navigating in the target cube or 3D shape to accurately navigate to the X, Y, Z coordinates of the target location with the target cube.

Returning to FIG. 1, as shown, the system 100 comprises an aerial vehicle 101 equipped with a variety of sensors that can be used for navigation, obstacle detection, and/or other flight functions. In one embodiment, the aerial vehicle 101 can fly or otherwise operate autonomously or under direct control via the UE 113 that may include or be associated with one or more software applications 115 supporting routing based on collision probability according to the embodiments described herein. As previously discussed, the system 100 further includes routing platform 107 coupled to the geographic database 109, wherein the routing platform 107 performs the functions associated with providing aerial routes based on a collision probability space according to the various embodiments described herein. In one embodiment, the aerial vehicle 101, routing platform 107, UE 113, and other components of the system 100 have connectivity to each other via the communication network 121.

In one embodiment, the aerial vehicle 101 is capable of operating autonomously or via a remote pilot using UE 113 to fly the aerial vehicle 101 or configure a flight path or route for the aerial vehicle 101. In one embodiment, the aerial vehicle 101 is configured to travel using one or more modes of operation through a 3D space represented as cubes or other 3D shapes. The aerial vehicle 101 may include any number of sensors including cameras, recording devices, communication devices, etc. By way example, the sensors may include, but are not limited to, a global positioning system (GPS) sensor for gathering location data based on signals from a positioning satellite, Light Detection And Ranging (LIDAR) for gathering distance data and/or generating depth maps, a network detection sensor for detecting wireless signals or receivers for different short-range communications (e.g., Bluetooth®, Wireless Fidelity (Wi-Fi), Li-Fi, Near Field Communication (NFC), etc.), temporal information sensors, a camera/imaging sensor for gathering image data, and the like. The aerial vehicle 101 may also include recording devices for recording, storing, and/or streaming sensor and/or other telemetry data to the UE 113 and/or the routing platform 107 for mapping or routing.

In one embodiment, the aerial vehicle 101 is capable of being configured with and executing at least one route based on a collision probability space according to the embodiments described herein. The aerial vehicle 101 can also be configured avoid areas with high risk levels, populated areas, objects, and/or obstructions. In addition, the aerial vehicle 101 can be configured to observe restricted paths or routes. For example, the restricted paths may be based on governmental regulations that govern/restrict the path that the aerial vehicle 101 may fly (e.g., Federal Aviation Administration (FAA) policies regarding required distances between objects). In one embodiment, the system 100 may also take into account one or more pertinent environmental or weather conditions (e.g., rain, water levels, sheer winds, etc. in and around underground passageways and their entry/exit points) in determining a route or flight path.

In one embodiment, the aerial vehicle 101 may determine contextual information such as wind and weather conditions in route that may affect the aerial vehicle 101's ability to follow the specified route and then relay this information in substantially real-time to the system 100. In one embodiment, the aerial vehicle 101 may request one or more modifications of the flight path based, at least in part, on the determination of the contextual information or a change in the real-time calculated risk levels over areas of interest (e.g., newly detected or updated risk factors causing a sudden and unexpected change in risk levels). In one embodiment, the system 100 creates a data object to represent the aerial route and may automatically modify the route data object based on receipt of the contextual information from the aerial vehicle 101 or another source and then transmit the new route object to the aerial vehicle 101 for execution. In one embodiment, the aerial vehicle 101 can determine or access the new route data object and/or determine or access just the relevant portions and adjust its current path accordingly. For example, if multiple highly dense population areas (e.g., buildings) are encountered, the system 100 may condense the width of the aerial vehicle 101's flight path to better ensure that the aerial vehicle 101 will avoid the closely situation population-dense areas.

By way of example, a UE 113 is any type of dedicated aerial vehicle control unit, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that a UE 113 can support any type of interface to the user (such as "wearable" circuitry, etc.). In one embodiment, a UE 113 may support any type of interface for piloting or routing the aerial vehicle 101. In addition, a UE 113 may facilitate various input means for receiving and generating information, including, but not restricted to, a touch screen capability, a keyboard and keypad data entry, a voice-based input mechanism, and the like. Any known and future implementations of a UE 113 may also be applicable.

By way of example, the UE 113 and/or the aerial vehicle 101 may execute applications 115, which may include various applications such as an aerial routing application, a location-based service application, a navigation application, a content provisioning application, a camera/imaging application, a media player application, an e-commerce application, a social networking application, and/or the like. In one embodiment, the applications 115 may include one or more feature applications used for providing aerial routes based on a collision probability space according to the embodiments described herein. In one embodiment, the application 115 may act as a client for the routing platform 107 and perform one or more functions of the routing platform 107 alone or in combination with the routing platform 107. In one embodiment, an application 115 may be considered as a Graphical User Interface (GUI) that can enable a user to configure a route or flight path for execution by aerial vehicle 101 according to the embodiments described herein.

In one embodiment, the communication network 121 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the routing platform 107 can interact with the services platform 117 to receive data for providing routing or operation of the aerial vehicle 101 based on dynamic collision probability determination. By way of example, the services platform 117 may include one or more services 119 or interact with one or more content providers 123a-123m for providing content services, provisioning services, application services, storage services, mapping services, navigation services, contextual information determination services, location-based services, information-based services (e.g., weather), etc. In one embodiment, the services platform 117 may interact with the aerial vehicle 101, UE 113, and/or routing platform 107 to supplement or aid in providing aerial routing based on a collision probability space.

By way of example, the aerial vehicle 101, UE 113, routing platform 107, and the services platform 117 communicate with each other and other components of the system 100 using well known, new or still developing protocols. In this context, a protocol includes a set of rules defining how the network nodes within the system 100 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 11:
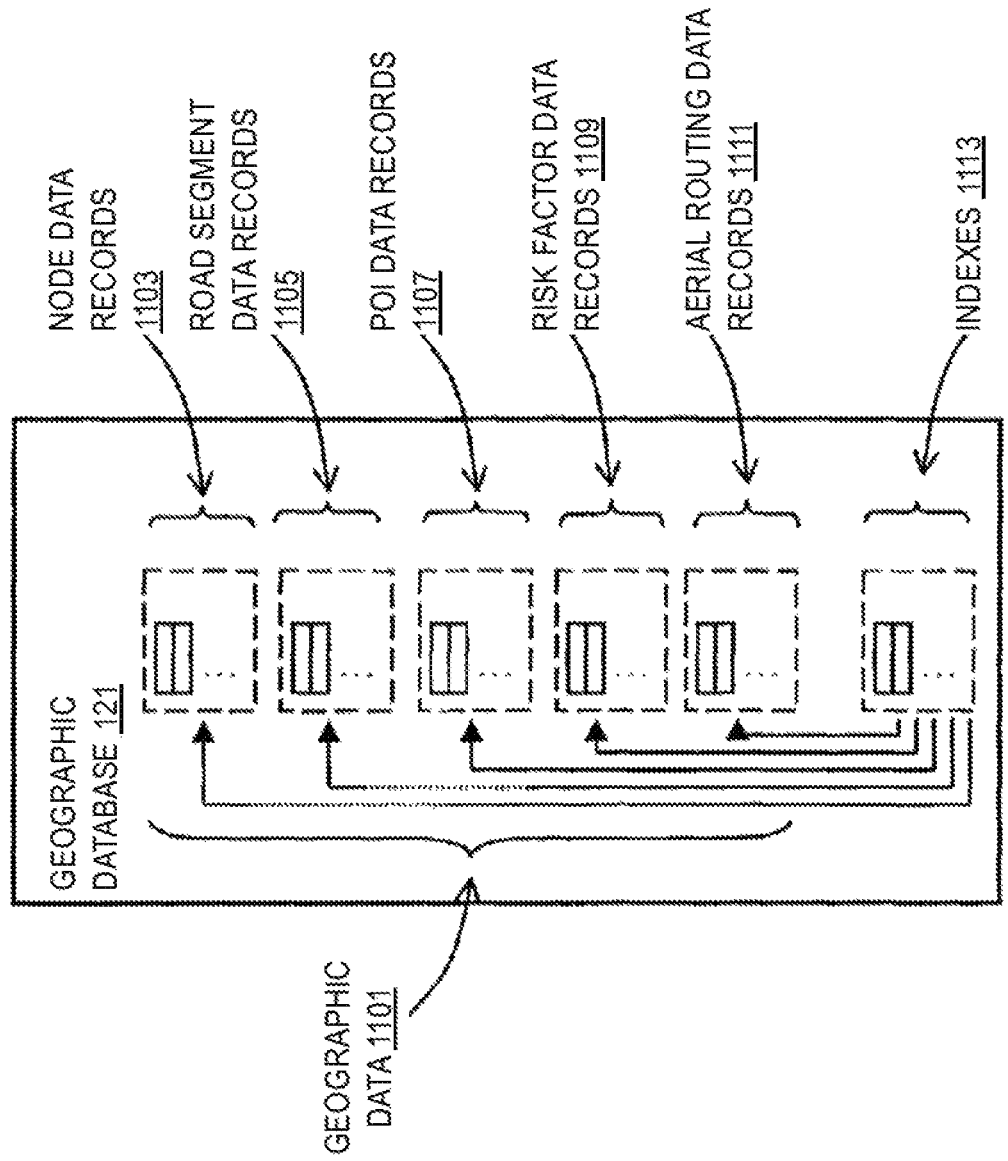
FIG. 11 is a diagram of a geographic database capable of storing map data for underground/interior drone routing, according to one embodiment.

FIG. 11 is a diagram of a geographic database 109, according to one embodiment. In one embodiment, the geographic database 109 includes geographic data 1101 used for (or configured to be compiled to be used for) mapping and/or navigation-related services, such as for routing aerial vehicles based on population density data to create a 3D flightpath or route.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions, models, routes, etc. Accordingly, the terms polygons and polygon extrusions/models as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic data 1101 of the database 109 includes node data records 1103, road segment or link data records 1105, POI data records 1107, risk factor data records 1109, aerial routing data records 1111, and indexes 1113, for example. More, fewer or different data records can be provided. In one embodiment, additional data records (not shown) can include cartographic ("carto") data records, routing data, and maneuver data. In one embodiment, the indexes 1113 may improve the speed of data retrieval operations in the geographic database 109. In one embodiment, the indexes 1113 may be used to quickly locate data without having to search every row in the geographic database 109 every time it is accessed. For example, in one embodiment, the indexes 1113 can be a spatial index of the polygon points associated with stored feature polygons.

In exemplary embodiments, the road segment data records 1105 are links or segments representing roads, streets, or paths, as can be used in the calculated route or recorded route information for determination of one or more personalized routes. The node data records 1103 are end points corresponding to the respective links or segments of the road segment data records 1105. The road link data records 1105 and the node data records 1103 represent a road network, such as used by vehicles, cars, and/or other entities. In addition, the geographic database 109 can contain path segment and node data records or other data that represent 3D paths around 3D map features (e.g., terrain features, buildings, other structures, etc.) that occur above street level, such as when routing or representing flightpaths of aerial vehicles (e.g., drones 101), for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 1107. The geographic database 109 can also include data about places, such as cities, towns, or other communities, and other geographic features, such as bodies of water, mountain ranges, etc. Such place or feature data can be part of the POI data records 1107 or can be associated with POIs or POI data records 1107 (such as a data point used for displaying or representing a position of a city).

In one embodiment, the geographic database 109 can also include risk factor data records 1109 for the digital map data representing risk factors or risk-related data, calculated risk levels (e.g., collision probability, probability of survival due to shape-related factors, probability of survival due to aerial-vehicle related factors, etc.), risk level visualizations, dynamic population density predictions generated for areas or interest, and related data. In one embodiment, the risk factor data records 1109 can be associated with one or more of the node records 1103, road segment records 1105, and/or POI data records 1107 so that the predicted population densities can inherit characteristics, properties, metadata, etc. of the associated records (e.g., location, address, POI type, etc.). In one embodiment, the system 100 (e.g., via the routing platform 107 can use the dynamic population density predictions to generate aerial vehicles routes.

In one embodiment, the system 100 is capable of generating aerial routes using the digital map data and/or real-time data stored in the geographic database 109 based on risk level visualization and/or predictions. The resulting aerial routing and guidance can be stored in the aerial routing data records 1111. By way of example, the routes stored in the data records 1111 can be created for individual 3D flightpaths or routes as they are requested by drones or their operators. In this way, previously generated aerial routes can be reused for future drone travel to the same target location.

In one embodiment, the aerial routes stored in the aerial routing data records 1111 can be specific to characteristics of the aerial vehicle 101 (e.g., drone type, size, supported modes of operation) and/or other population density characteristics of the route. In addition, the aerial routes generated according to the embodiments described herein can be based on contextual parameters (e.g., time-of-day, day-of-week, season, etc.).

In one embodiment, the geographic database 109 can be maintained by the services platform 117 and/or any of the services 119 of the services platform 117 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ aerial drones (e.g., using the embodiments of the privacy-routing process described herein) or field vehicles (e.g., mapping drones or vehicles equipped with mapping sensor arrays, e.g., LiDAR) to travel along roads and/or within buildings/structures throughout the geographic region to observe features and/or record information about them, for example. Also, remote sensing, such as aerial or satellite photography or other sensor data, can be used.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation capable device or vehicle, such as by the aerial vehicle 101, for example. The navigation-related functions can correspond to 3D flightpath or navigation, 3D route planning for package delivery, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing aerial route calculation in a 3D space may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
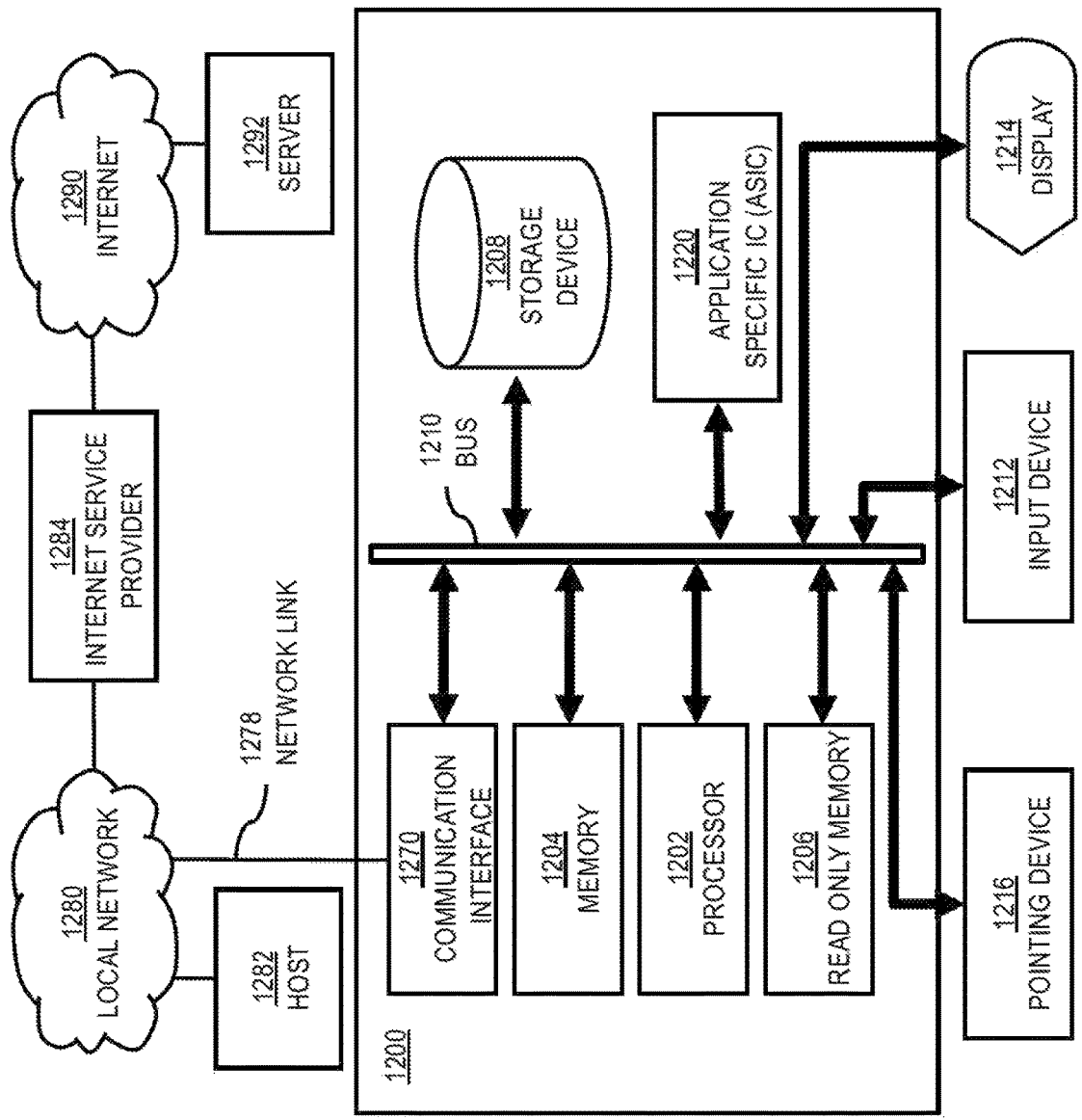
FIG. 12 is a diagram of hardware that can be used to implement an embodiment.

FIG. 12 illustrates a computer system 1200 upon which an embodiment of the invention may be implemented. Computer system 1200 is programmed (e.g., via computer program code or instructions) to provide aerial route calculation in a 3D space as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to providing aerial route calculation in a 3D space. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing aerial route calculation in a 3D space. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing aerial route calculation in a 3D space, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 121 for providing aerial route calculation in a 3D space.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204.

Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 13 illustrates a chip set 1300 upon which an embodiment of the invention may be implemented. Chip set 1300 is programmed to provide aerial route calculation in a 3D space as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide aerial route calculation in a 3D space. The memory 1305 also stores the data associated with or generated by the execution of the inventive steps.

Figure 14:
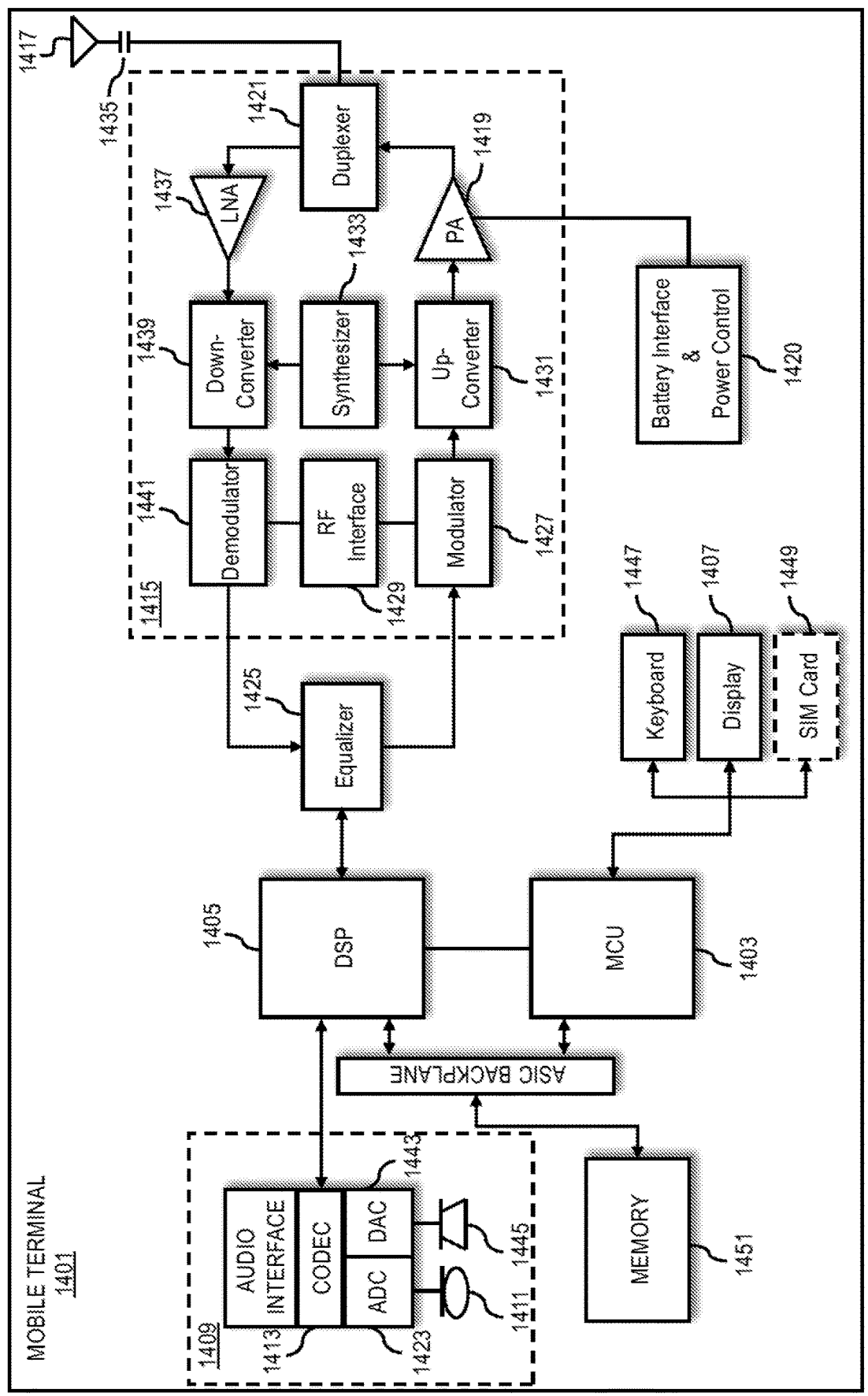
FIG. 14 is a diagram of a mobile terminal (e.g., handset or aerial vehicle or part thereof) that can be used to implement an embodiment.

FIG. 14 is a diagram of exemplary components of a mobile terminal (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to provide aerial route calculation in a 3D space. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network.

The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for routing an aerial vehicle through a three-dimensional space, comprising:
   receiving a request to route the aerial vehicle through the three-dimensional space from a start location to a target location, wherein the three-dimensional space is represented as a plurality of three-dimensional shapes;
   matching the start location and the target location respectively to a start shape and a target shape of the plurality of three-dimensional shapes;
   computing a route through the plurality of three-dimensional shapes from the start shape to the target shape based on a collision probability determined based on a first probability of survival due to volume-related factors, a second probability of survival due to aerial-vehicle-related factors, or a combination thereof for the plurality of three-dimensional shapes from the start shape to the target shape,
   wherein the path includes a set of three-dimensional shapes between the start shape and the target shape;
   determining that the collision probability for the route is below a survival threshold; and
   selecting another aerial vehicle to fly the route based on the another aerial vehicle having a higher probability of survival due to aerial-vehicle related factors than the aerial vehicle.

2. The method of claim 1, wherein the plurality of three-dimensional shapes is a plurality of cubes.

3. The method of claim 1, wherein the first probability of survival is based on a collision probability computed from map data of the three-dimensional space.

4. The method of claim 1, wherein the second probability of survival is based on a one or more intrinsic factors of the aerial vehicle.

5. The method of claim 4, further comprising:
   computing the second probability of survival as a function of a number of the plurality of three-dimensional shapes that the aerial vehicle is predicted to traverse before a predicted failure due to the one or more intrinsic factors.

6. The method of claim 1, further comprising:
   selecting a resolution for the plurality of three-dimensional shapes, wherein the resolution determines an amount of the three-dimensional space represented by a volume of the plurality of three-dimensional shapes, wherein the route is computed based on the resolution.

7. A method for routing an aerial vehicle through a three-dimensional space, comprising:
   receiving a request to route the aerial vehicle through the three-dimensional space from a start location to a target location, wherein the three-dimensional space is represented as a plurality of three-dimensional shapes;
   matching the start location and the target location respectively to a start shape and a target shape of the plurality of three-dimensional shapes;
   computing a route through the plurality of three-dimensional shapes from the start shape to the target shape based on a collision probability determined based on a first probability of survival due to volume-related factors, a second probability of survival due to aerial-vehicle-related factors, or a combination thereof for the plurality of three-dimensional shapes from the start shape to the target shape,
   wherein the path includes a set of three-dimensional shapes between the start shape and the target shape;
   selecting a resolution for the plurality of three-dimensional shapes, wherein the resolution determines an amount of the three-dimensional space represented by a volume of the plurality of three-dimensional shapes, wherein the route is computed based on the resolution;
   determining that the collision probability for the route is below a survival threshold;
   selecting another resolution for the plurality of three-dimensional shapes; and
   re-computing the route based on the another resolution.

8. The method of claim 1, further comprising:
   determining an insurance cost, a delivery cost, or a combination thereof for the aerial vehicle to fly the route based on the collision probability for the route.

9. The method of claim 1, wherein the request specifies a threshold value for the collision probability, and wherein the route is further computed based on the threshold value.

10. The method of claim 1, further comprising:
    encoding the route, the collision probability for one or more of the plurality of three-dimensional shapes from the start shape to the target shape, or a combination there in an output; and
    transmitting the output the aerial vehicle.

11. An apparatus for routing an aerial vehicle through a three-dimensional space comprising:
    at least one processor; and
    at least one memory including computer program code for one or more programs,
    the at least one memory and the computer program code configured to, with the at least one processor, cause the apparatus to:
      transmit a request for a route through the three-dimensional space from a start location to a target location;
      in response to the request, receive a route that is generated based on representing the three-dimensional space as a plurality of three-dimensional shapes,
        wherein the route matches the start location and the target location respectively to a start shape and a target shape of the plurality of three-dimensional shapes; and
        wherein the route comprises the start shape, the target shape, and a set of the plurality of three-dimensional shapes traversing from the start shape to the target shape, and wherein the plurality of three-dimensional shapes is a plurality of cubes;
      receive collision probability data for the plurality of three-dimensional shapes in the route;
      determine to reject or to accept the route based on the collision probability:
      determine a trajectory for a current position of the aerial vehicle to a closest point on a face of a next cube on the route;
      navigate the aerial vehicle along the trajectory;
      determine that the collision probability data for a cube traversed by the trajectory is below a threshold value; and navigate the aerial vehicle along the trajectory with an onboard sensor the aerial configured in a low power mode.

12. The apparatus of claim 11, wherein the apparatus is further caused to:
transmit another request for the route, the another request specifying a collision probability threshold; and
in response to the another request, receive another route based on the collision probability threshold.

13. The apparatus of claim 11, wherein the plurality of three-dimensional shapes is a plurality of cubes, and wherein the apparatus is further caused to:
determine a trajectory for a current position of the aerial vehicle to a closest point on a face of a next cube on the route; and
navigate the aerial vehicle along the trajectory.

14. The apparatus of claim 11, wherein the apparatus is further caused to:
process sensor data of the aerial vehicle to determine a presence of an obstacle along the trajectory; and
select another point on the face of the cube to determine the trajectory to avoid the obstacle.

15. The apparatus of claim 11, wherein the apparatus is further caused to:
determine that the collision probability data for a cube to be traversed by the trajectory is above a threshold value; and
navigate the aerial vehicle along the trajectory at a speed determined based on a response time of an onboard sensor of the aerial vehicle.

16. A non-transitory computer-readable storage medium for routing an aerial vehicle through a three-dimensional space, carrying one or more sequences of one or more instructions which, when executed by one or more processors, cause an apparatus to perform:
receiving a request to route the aerial vehicle through the three-dimensional space from a start location to a target location, wherein the three-dimensional space is represented as a plurality of three-dimensional shapes;
matching the start location and the target location respectively to a start shape and a target shape of the plurality of three-dimensional shapes;
computing a route through the plurality of three-dimensional shapes from the start shape to the target shape based on a collision probability determined based a first probability of survival due to volume-related factors, a second probability of survival due to aerial-vehicle-related factors, or a combination thereof for the plurality of three-dimensional shapes from the start shape to the target shape,
wherein the path includes a set of three-dimensional shapes between the start shape and the target shape;
determining that the collision probability for the route is below a survival threshold; and
selecting another aerial vehicle to fly the route based on the another aerial vehicle having a higher probability of survival due to aerial-vehicle related factors than the aerial vehicle.

17. The non-transitory computer-readable storage medium of claim 16, wherein the first probability of survival is based on a collision probability computed from map data of the three-dimensional space.

18. The non-transitory computer-readable storage medium of claim 16, wherein the second probability of survival is based on a one or more intrinsic factors of the aerial vehicle.

* * * * *